United States Patent
Osora et al.

(10) Patent No.: US 8,142,662 B2
(45) Date of Patent: Mar. 27, 2012

(54) DEHYDRATING SYSTEM AND METHOD FOR CONTROL OF SPARE MEMBRANE UNIT

(75) Inventors: Hiroyuki Osora, Hiroshima (JP); Yoshio Seiki, Hiroshima (JP); Atsuhiro Yukumoto, Hiroshima (JP); Yukio Tanaka, Hiroshima (JP); Shinji Ogino, Mihara (JP); Haruaki Hirayama, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/465,079

(22) Filed: May 13, 2009

(65) Prior Publication Data

US 2010/0288682 A1    Nov. 18, 2010

(51) Int. Cl.
*B01D 61/36*  (2006.01)
*B01D 53/22*  (2006.01)
*B01D 69/10*  (2006.01)
*B01D 63/06*  (2006.01)
*B01D 71/02*  (2006.01)

(52) U.S. Cl. ...... 210/640; 210/93; 210/96.2; 210/321.6; 210/322; 210/253; 95/52; 95/45; 96/6; 96/7; 96/8; 96/10

(58) Field of Classification Search ............ 210/253
See application file for complete search history.

(56) References Cited

U.S. PATENT DOCUMENTS

| | | | |
|---|---|---|---|
| 4,049,548 A * | 9/1977 | Dickerson | 210/96.1 |
| 4,894,163 A * | 1/1990 | Watanabe et al. | 210/640 |
| 2007/0125722 A1 | 6/2007 | De Biran et al. | |

FOREIGN PATENT DOCUMENTS

| | | | |
|---|---|---|---|
| CA | 2 540 205 A1 | | 4/2005 |
| CA | 2675397 | * | 9/2008 |
| CA | 2675399 | * | 9/2008 |
| EP | 1782874 A1 | | 5/2007 |
| WO | 96/16725 A1 | | 6/1996 |
| WO | 2004-106697 A1 | | 12/2004 |

(Continued)

OTHER PUBLICATIONS

Wu et al. ("Mass transfer in pervaporation of active fermentation broth with a composite PDMS membrane," Separation Purification Technology 2005: 42, 47-53).*

(Continued)

*Primary Examiner* — Krishnan S Menon
*Assistant Examiner* — Michelle Adams
(74) *Attorney, Agent, or Firm* — Westerman, Hattori, Daniels & Adrian, LLP

(57) ABSTRACT

A dehydrating system is designed to maintain the availability of a plant having the dehydrating system using a water separation membrane by allowing a water separation membrane unit to be replaced while the plant is in operation. The dehydrating system comprises at least two water separation membrane units in use arranged parallel to the direction of flow of a fluid to be processed, is configured so that at least one spare water separation membrane unit can be installed parallel to the direction of flow of the fluid to be processed with respect to the at least two water separation membrane units, having monitoring devices for the product fluid to be taken out, and maintains the properties of the product fluid by operating the spare water separation membrane unit depending on the properties of the product fluid monitored by the monitoring devices.

13 Claims, 1 Drawing Sheet

FOREIGN PATENT DOCUMENTS

| | | |
|---|---|---|
| WO | 2005/030647 A2 | 4/2005 |
| WO | 2008/111671 A1 | 9/2008 |
| WO | WO 2008/111672 * | 9/2008 |

OTHER PUBLICATIONS

Fontalvo et al. "Comparing Pervaporation and Vapor Permeation Hybrid Distillation Processes," Ind. Eng. Chem. Res. 2005, 44, 5259-5266.*

Rhim et al. "Pervaporation Separation of Ethanol-Water Mixtures Using Nylon 4 and Its Blended Membranes," J. of Korean Ind. & Eng. Chemistry, 1993, 4, 791-797.*

European Search Report dated Sep. 18, 2009, issued in corresponding European Patent Application No. 09161025.3.

Canadian Office Action dated Mar. 4, 2011, issued in corresponding Canadian Patent Application No. 2,665,294.

* cited by examiner

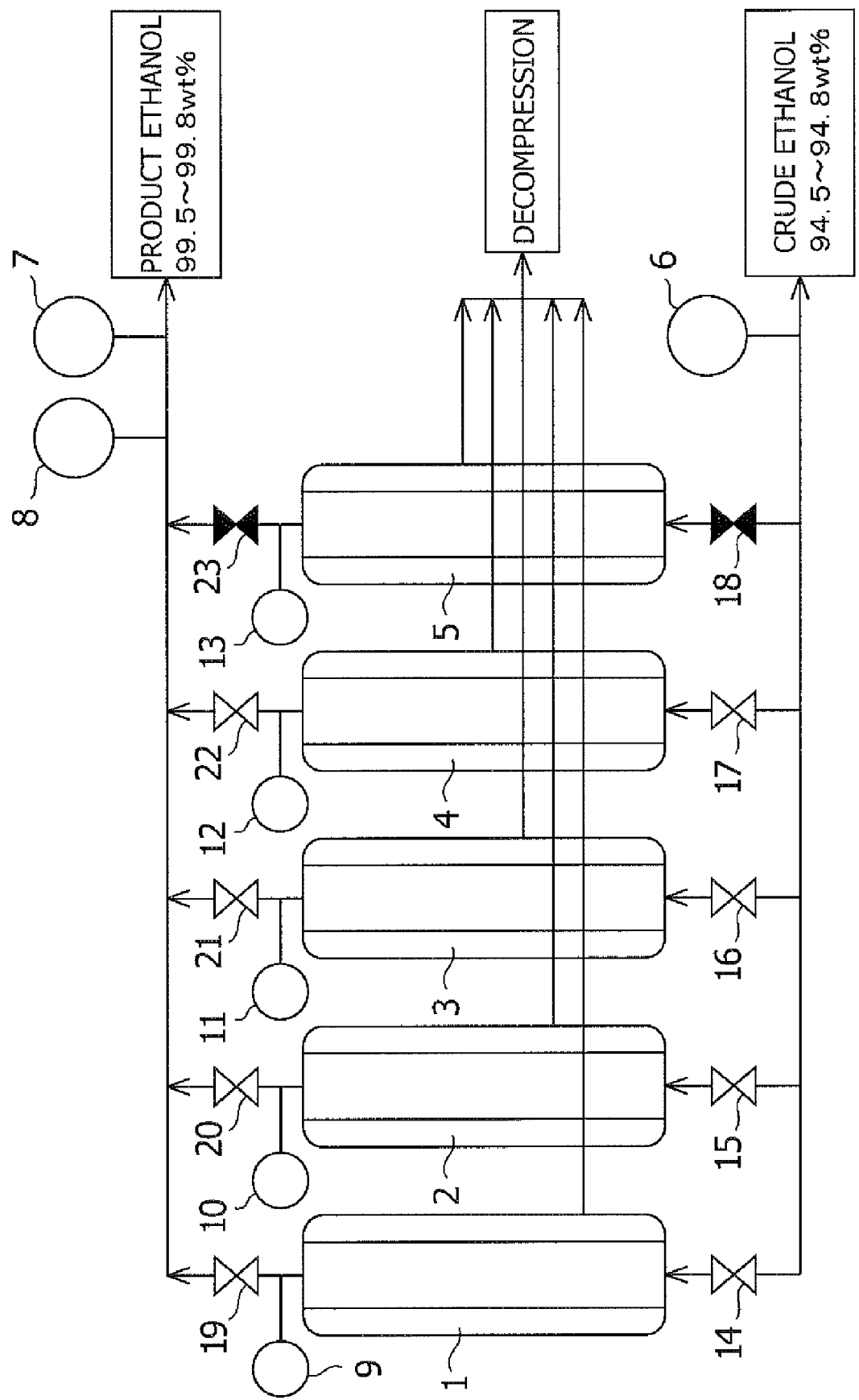

DEHYDRATING SYSTEM AND METHOD FOR CONTROL OF SPARE MEMBRANE UNIT

BACKGROUND OF THE INVENTION

1. Field of the Invention

The present invention relates to a dehydrating system which uses a water separation membrane, and more specifically relates to a dehydrating system designed to appropriately deal with the degradation of the water separation membrane in dehydrating a mixture of water and ethanol or propanol having an azeotropic composition with water, hereinafter referred to as a fluid to be processed.

2. Description of the Related Art

Ethanol has been attracting attention as an alternative energy source to replace oil and has a market size estimated at 55,000,000 kL in 2010. However, to use ethanol as a fuel, ethanol must be dehydrated to at least 99.5 wt % after distillation and purification of a crude product obtained from a biomass source such as corn.

For dehydration, a dilute aqueous solution of ethanol has traditionally been concentrated nearly to the azeotropic point of the ethanol/water system by distilling the solution in a distillation column and then this was dehydrated.

There is a dehydration technique which adds an entrainer and dehydrates by azeotropic distillation. However, this technique has some disadvantages, such as a huge amount of thermal energy required because of the need for a step which subjects a ternary system to azeotropic distillation and recovers the entrainer.

In addition, there is also a dehydration technique in which multiple molecular sieve vessels are arranged in parallel and switches are made between them on a batch basis for dehydration However, this technique also has the problem of high energy consumption required for the regeneration of molecular sieve vessels.

Thus, the use of an element without the above disadvantages, such as a water separation membrane, has been considered (Japanese Patent Application Laid-Open No. 58-21629).

However, if pervaporation (PV) using a water separation membrane unit comprising a water separation membrane is adopted, the water separation membrane unit typically has a service life of about 2 years and requires annual replacement of all the water separation membranes. The water separation membrane unit has the problem of reduced availability of the plant using the unit because of the inevitable downtime of the plant during the replacement.

The present invention has been made in view of the above circumstances and has as an object providing a dehydrating system designed to maintain the availability of a plant equipped with a dehydrating system using a water separation membrane by allowing water separation membrane units to be replaced while the plant is in operation.

SUMMARY OF THE INVENTION

To achieve the object, the present invention provides a dehydrating system that separates water from a fluid to be processed, wherein the dehydrating system comprises at least two water separation membrane units in use arranged parallel to the direction of flow of the fluid to be processed; the dehydrating system is configured so that at least one spare water separation membrane unit can be installed parallel to the direction of flow of the fluid to be processed with respect to the at least two water separation membrane units; the dehydrating system comprises a monitoring device for a product fluid to be taken out; and the dehydrating system maintains the properties of the product fluid by operating the at least one spare water separation membrane unit depending on the properties of the product fluid monitored by the monitoring device.

In the dehydrating system according to the present invention, the fluid to be processed is generally an organic aqueous solution. The organic component of which is preferably one organic component selected from the group consisting of alcohols such as ethanol, propanol, isopropanol, and glycol, carboxylic acids such as acetic acid, ethers such as dimethyl ether and diethyl ether, aldehydes such as acetaldehyde, ketones such as acetone and methyl ethyl ketone, and esters such as ethyl acetate.

An embodiment of the dehydrating system according to the present invention comprises a densitometer monitoring the concentration of the organic component of the product fluid to be taken out of the entire dehydrating system as the monitoring device for the product fluid.

Another embodiment of the dehydrating system according to the present invention comprises a densitometer monitoring the concentration of the organic component of the product fluid to be taken out of each of the water separation membrane units as the monitoring device for the product fluid, wherein the densitometer is installed on each of the water separation membrane units.

Yet another embodiment of the dehydrating system according to the present invention comprises a thermometer monitoring the temperature of the product fluid to be taken out of each of the water separation membrane units as the monitoring device for the product fluid.

The present invention provides a dehydrating system designed to maintain the availability of a plant equipped with a dehydrating system using a water separation membrane by allowing a water separation membrane unit to be replaced while the plant is in operation.

BRIEF DESCRIPTION OF THE DRAWINGS

FIG. 1 is a schematic view illustrating an embodiment of the dehydrating system according to the present invention.

DESCRIPTION OF REFERENCE NUMERALS

1 to 5: Water separation membrane units
6: Inlet flowmeter
7: Outlet flowmeter
8: Outlet densitometer
9, 10, 11, 12, and 13: Individual densitometers

DETAILED DESCRIPTION OF THE PREFERRED EMBODIMENT

The dehydrating system according to the present invention will be described in detail with reference to an embodiment thereof.

FIG. 1 is an embodiment of the dehydrating system according to the present invention. The dehydrating system according to the embodiment assumes that the fluid to be processed for dehydration is crude ethanol. It is assumed that this crude ethanol is an aqueous solution having an ethanol concentration of 94.5 wt % to 94.8 wt % (both inclusive). In other words, crude ethanol containing ethanol as the organic component is considered to be the fluid to be processed. The final product fluid, namely, product ethanol (absolute ethanol), has an ethanol concentration of 99.5 wt % to 99.8 wt % (both inclusive).

The dehydrating system according to the embodiment consists mainly of water separation membrane units 1 to 5, an inlet flowmeter 6, an outlet flowmeter 7, outlet densitometer 8, and individual densitometers 9 to 13. The dehydrating system further has inlet valves 14 to 18 and outlet valves 19 to 23 for the water separation membrane units 1 to 5.

The water separation membrane units 1 to 5 are units to separate the crude ethanol into absolute ethanol and water. The water separation membrane as a constituent of the water separation membrane units is preferably a silica or zeolite inorganic water separation membrane having a pore size of 10 angstroms or less. The water separation membrane may also be a carbon membrane.

In addition, the inorganic water separation membrane according to Japanese Patent No. 2808479 is also applicable. This inorganic water separation membrane is an acid-resistant composite separation membrane, obtained by supporting silica gel obtained through hydrolysis of alkoxysilane containing an ethoxy group or a methoxy group within the pores of an inorganic porous body, which can be produced by a production process including the following steps 1 to 11.

The porous substrate described below is generally a ceramic substrate such as alumina, silica, zirconia, or titania, and preferably a cylindrical substrate which has multiple inner tubes having a circular cross section in the longitudinal direction. In the following steps 1 to 11, an inorganic water separation membrane is formed to cover the inner wall of each of these inner tubes. This is the meaning of the phrase "supporting silica gel obtained through hydrolysis of alkoxysilane containing an ethoxy group or a methoxy group within the pores of an inorganic porous body."

An organic membrane such as a polyvinyl alcohol membrane, a polyimide membrane, and a polyamide membrane can be used as the water separation membrane in addition to the inorganic water separation membranes. These organic membranes also change over time and are applicable to the present invention.

Step 1: In preparation conditions for multiple silica sols produced by varying the mixing ratio of alkoxysilane, water, and an acid catalyst as the raw materials of silica sol, the mixing ratios of the raw materials of the silica sol to be supported are divided into two types: one for silica sol 1 and the other for silica sol 2.

Step 2: The weight of water relative to the weight of alkoxysilane as one of the raw materials of silica sol 1 is 0.5 to 2.0 (both inclusive), whereas the weight of an acid catalyst as a reaction catalyst relative to the weight of alkoxysilane is 0.01 to 0.1 (both inclusive).

Step 3: The weight of water relative to the weight of alkoxysilane as one of the raw materials of silica sol 2 is 2.0 to 50 (both inclusive), whereas the weight of an acid catalyst as a reaction catalyst relative to the weight of alkoxysilane is 0.01 to 0.5 (both inclusive).

Step 4: While the raw materials of silica sol 1 are kept at the boil, the solutions about 25, 20, and 15 minutes after the start of boiling are defined as 1-A solution, 1-B solution, and 1-C solution, respectively.

Step 5: The raw materials of silica sol 2 are stirred and mixed at room temperature for 30 to 90 minutes to produce silica sol 2.

Step 6: After the silica sol 1-A solution is supported on the surface of a porous substrate, the porous substrate is burned in an electric furnace set at about 200° C. for 5 to 15 minutes (both inclusive), then at about 300° C. for 5 to 15 minutes (both inclusive), then about 400° C. for 5 to 15 minutes (both inclusive), and finally at about 500° C. for 5 to 15 minutes (both inclusive).

Step 7: After the silica sol 1-A solution is further supported on the surface of the porous substrate on which the silica sol 1-A solution has been supported, the operation of step 6 above is repeated two or three times.

Step 8: Next, after the silica sol 1-B solution is further supported on the surface of the porous substrate on which the silica sol 1-A solution has been supported, the same processing as in steps 6 and 7 above is performed.

Step 9: Next, after the silica sol 1-C solution is further supported on the surface of the porous substrate on which the silica sol 1-B solution has been supported, the same processing as in steps 6 and 7 above is performed.

Step 10: Next, after the silica sol 2 solution is further supported on the surface of the porous substrate on which the silica sol 1-A, 1-B, and 1-C solutions have been supported, the porous substrate is burned in an electric furnace set at about 200° C. for 5 to 15 minutes (both inclusive), then at about 300° C. for 5 to 15 minutes (both inclusive), then about 400° C. for 5 to 15 minutes (both inclusive), and finally at about 500° C. for 5 to 15 minutes (both inclusive).

Step 11: After the silica sol 2 solution is further supported on the surface of the porous substrate on which the silica sol 2 solution has been supported, the operation of step 10 above is repeated two or three times.

A cylindrical porous substrate supporting an inorganic water separation membrane within each of the inner tubes thereof (covering each inner tube with an inorganic water separation membrane) can be obtained through steps 1 to 11 above. In the present invention, such a substrate, for example, is used as a water separation membrane built into each of the water separation membrane units 1 to 5, each of which has such a water separation membrane built into a container which can be decompressed.

Crude ethanol is preheated to about 90° C. by a heat exchanger (not shown in the figure). The crude ethanol flows through the inner tubes of the water separation membrane because the water separation membrane units 1 to 5 are designed so that the crude ethanol is introduced via the inlet flowmeter 6 and inlet valves 14 to 18 into the units by pumps (not shown in the figure). Water is separated from the crude ethanol by decompressing the water separation membrane. The ethanol from which water has been separated is taken out as product ethanol via the outlet valves 19 to 23 and then the outlet densitometer 8 and the outlet flowmeter 7. The outlet concentrations of the water separation membrane units 9 to 13 are monitored by the individual densitometers 9 to 13.

The dehydrating system according to the present embodiment only uses the water separation membrane units 1 to 4, for example, at the initial operation. The total rates of flow into and out of the water separation membrane units 1 to 4 are monitored by the inlet flowmeter 6 and the outlet flowmeter 7. The outlet densitometer 8 monitors the ethanol concentration of the product ethanol to check that the concentration is maintained at or above the desired set point. At the same time, the individual densitometers 9 to 12 monitor the outlet concentrations of the water separation membrane units 1 to 4. On the other hand, the water separation membrane unit 5 is a spare water separation membrane unit and is not operated at the initial operation.

Water separation membranes generally degrade as they are used. When the characteristics of any of the water separation membrane units 1 to 4 degrade, the spare water separation membrane unit 5 is operated by a technique as described below.

(1) Of the water separation membrane units 1 to 4, the flow rate of the unit whose characteristics have degraded is reduced. Any characteristics degradation is detected by concentrations measured by the individual densitometers 9 to 12. The outlet densitometer 8 monitors the concentration of the product ethanol to check that the concentration is at or above the desired set point When the outlet flowmeter 7 shows that only a product ethanol flow rate below the set point can be maintained after the flow rate is reduced, the spare water separation membrane unit 5 is operated to maintain the flow rate of the product ethanol.

Such control can be automatically performed by a control unit (not shown in the figure).

On the other hand, in addition, the outlet valve and inlet valve of the water separation membrane unit that is operating worst are closed to stop the operation of the unit. Then, the water separation membrane unit whose operation has been stopped is replaced with a fresh water separation membrane unit. The replaced water separation membrane unit is put on standby as a fresh spare water separation membrane unit. The performance of the dehydrating system can be maintained by following the above procedure without stopping the operation thereof.

(2) The technique described in (1) above also makes it possible to operate the spare water separation membrane unit 5 and stop the operation of the water separation membrane unit of which the characteristics have degraded to conduct the replacement of the units without any control such as reducing the flow rate of the degraded unit.

(3) At the initial operation, it is also possible to appropriately reduce the flow rates of the water separation membrane units 1 to 4 without pushing the flow rates to the limit and control the overall outlet flow rate depending on changes in the characteristics of the water separation membrane units.

It is also possible to begin to operate a spare water separation membrane unit on a yearly basis, for example, and replace any of the other water separation membrane units without installing the separate densitometers 9 to 13. If FIG. 1 is used as an example, the water separation membrane units 1 to 4 were stopped and all replaced once about every 2 years.

It is virtually no problem to begin to operate a fresh spare water separation membrane unit and replace a water separation membrane unit once a year. In this case, the number of units to be replaced is half as many as before. For replacement every 6 months, the number of units to be replaced is the same as before because the number of all units in operation is four. In either case, there is no need to stop the operation of the entire dehydrating system.

In addition, the number of water separation membrane units in use and the number of spare water separation membrane units are not limited to the numbers shown by the embodiment in FIG. 1.

More specifically, if a system comprises at least two water separation membrane units in use arranged parallel to the direction of flow of the fluid to be processed and is configured so that at least one spare water separation membrane unit can be installed parallel to the direction of flow of the fluid to be processed with respect to the at least two water separation membrane units, the system can be configured as the dehydrating system according to the present invention.

In the dehydrating system according to the present invention, a thermometer to monitor the temperature of the product fluid taken out of each of the water separation membrane units 1 to 5 can also be installed at the outlet and inlet (at least the outlet) of each of the water separation membrane units 1 to 5 as a monitoring device for the product fluid with a densitometer or instead of a densitometer.

If a silica membrane is used as the water separation membrane, the dissolution of silica degrades the performance of the water separation membrane. This allows ethanol and water to permeate together through the membrane, increases the latent heat of the fluid, and decreases the outlet temperature. For example, if usually the fluid flows into the unit at 90° C. and out of the unit at 40° C., the outlet temperature may be further reduced. In this case, the decrease in temperature is considered to be due to degradation, and the flow rate is reduced and a spare water separation membrane unit is operated as needed.

In addition, the pores of a water separation membrane may be clogged with iron rust, adhesive material, or solid material. This increases the outlet temperature. If usually the fluid flows out of the unit at 40° C., the outlet temperature may not be reduced to the temperature. In this case, the increase in temperature is considered to be due to degradation, and the flow rate is reduced and a spare water separation membrane unit is operated as needed.

In the embodiment in FIG. 1, a fluid to be processed containing ethanol as the organic component is to be dehydrated. In the dehydrating system according to the present invention, however, the fluid to be processed is not limited to such a fluid if the fluid is an organic aqueous solution. More specifically, the organic component of the organic aqueous solution may be preferably one organic component selected from the group consisting of alcohols such as ethanol, propanol, isopropanol, and glycol, carboxylic acids such as acetic acid, ethers such as dimethyl ether and diethyl ether, aldehydes such as acetaldehyde, ketones such as acetone and methyl ethyl ketone, and esters such as ethyl acetate.

What is claimed is:

1. A dehydrating system that removes water from a fluid to be processed comprising an organic component and that provides a product fluid comprising the organic component, the dehydration system comprising:
   at least two water separation membrane units in use arranged parallel to a direction of flow of the fluid to be processed;
   at least one spare water separation membrane unit installed parallel to the direction of flow of the fluid to be processed with respect to the at least two water separation membrane units;
   a monitoring means to monitor a concentration of the organic component of the product fluid for product fluid taken out of each of the at least two water separation membrane units;
   a monitoring device configured to monitor a temperature of the product fluid for product fluid taken out of each of the at least two water separation membrane units; and
   a control unit configured to replace operation of one of the at least two water separation membrane units with operation of one of the at least one spare water separation membrane unit to maintain properties of the product fluid depending on the concentration of the organic component of the product fluid as monitored by the monitoring means and the temperature of the product fluid as monitored by the monitoring device.

2. The dehydrating system according to claim 1 wherein the fluid to be processed is an organic aqueous solution containing the organic component.

3. The dehydrating system according to claim 2, wherein the organic component of the organic aqueous solution is one organic component selected from the group consisting of alcohol, glycol, carboxylic acid, ether, aldehyde, ketone, and ester.

4. The dehydrating system according to claim 3,
wherein said alcohol is selected from the group consisting of ethanol, propanol, and isopropyl alcohol;
wherein said carboxylic acid is acetic acid;
wherein said ether is selected from the group consisting of dimethyl ether and diethyl ether;
wherein said aldehyde is acetaldehyde;
wherein said ketone is selected from the group consisting of acetone and methyl ethyl ketone; or
wherein said ester is ethyl acetate.

5. The dehydrating system according to claim 2 comprising a densitometer that monitors the concentration of the organic component of the product fluid for product fluid taken out of the entire dehydrating system.

6. The dehydrating system according to claim 2, wherein the monitoring means comprises a plurality of densitometers, wherein a densitometer is installed at each of the at least two water separation membrane units.

7. The dehydrating system according to claim 1, wherein the dehydrating system is configured to maintain the concentration of the organic component of the product fluid by reducing product flow rate of a water separation membrane unit whose characteristics have degraded, and if only product flow rate below a set point can be maintained after the reducing of product flow rate, the dehydrating system is configured to maintain the concentration of the organic component of the product fluid by operating the at least one spare water separation membrane unit.

8. A dehydrating method comprising:
providing a dehydrating system comprising a plurality of water separation membrane units installed parallel to a direction of flow of a fluid to be processed that contains an organic component, the plurality of water separation membrane units comprising at least two operative water separation membrane units and at least one spare water separation membrane unit;
removing water from the fluid to be processed through the at least two operative water separation membrane units to provide a product fluid taken out of each operative water separation membrane unit, the product fluid comprising the organic component;
monitoring a concentration of the organic component of the product fluid taken out of each operative water separation membrane unit;
monitoring a temperature of the product fluid taken out of each operative water separation membrane unit; and
replacing operation of one of the at least two operative water separation membrane units by operating the at least one spare water separation membrane unit depending on the monitored concentration and the monitored temperature to maintain properties of the product fluid.

9. The dehydrating method according to claim 8, further comprising monitoring a concentration of the organic component of product fluid taken out of the entire dehydrating system.

10. The dehydrating method according to claim 8, further comprising monitoring a flow rate of product fluid from the entire dehydrating system.

11. The dehydrating method according to claim 10, wherein a concentration of the organic component of the product fluid is maintained by reducing product flow rate of an operative water separation membrane unit whose characteristics have degraded, and if only product flow rate below a set point can be maintained after the reducing of product flow rate, maintaining the concentration of the organic component of the product fluid by operating the at least one spare water separation membrane unit.

12. The dehydrating method according to claim 8, wherein the fluid to be processed is an organic aqueous solution and the organic component is one organic component selected from the group consisting of alcohol, glycol, carboxylic acid, ether, aldehyde, ketone, and ester.

13. The dehydrating system according to claim 12,
wherein said alcohol is selected from the group consisting of ethanol, propanol, and isopropyl alcohol;
wherein said carboxylic acid is acetic acid;
wherein said ether is selected from the group consisting of dimethyl ether and diethyl ether;
wherein said aldehyde is acetaldehyde;
wherein said ketone is selected from the group consisting of acetone and methyl ethyl ketone; or
wherein said ester is ethyl acetate.

* * * * *